(12) United States Patent
Cerny et al.

(10) Patent No.: US 10,176,621 B2
(45) Date of Patent: Jan. 8, 2019

(54) USING COMPUTE SHADERS AS FRONT END FOR VERTEX SHADERS

(71) Applicant: Sony Interactive Entertainment Inc., Tokyo OT (JP)

(72) Inventors: Mark Evan Cerny, Los Angeles, CA (US); David Simpson, Los Angeles, CA (US); Jason Scanlin, Los Angeles, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 39 days.

(21) Appl. No.: 14/297,248

(22) Filed: Jun. 5, 2014

(65) Prior Publication Data

US 2014/0362081 A1 Dec. 11, 2014

Related U.S. Application Data

(60) Provisional application No. 61/833,229, filed on Jun. 10, 2013.

(51) Int. Cl.
*G06T 15/60* (2006.01)
*G06T 15/00* (2011.01)
(Continued)

(52) U.S. Cl.
CPC ............ *G06T 15/005* (2013.01); *G06T 15/30* (2013.01); *G06T 15/40* (2013.01)

(58) Field of Classification Search
CPC ..... G06T 15/506; G06T 15/005; G06T 17/20; G06T 19/00; G06T 15/40; G06T 11/001; G06T 15/04; G06T 1/60
(Continued)

(56) References Cited

U.S. PATENT DOCUMENTS 5,615,402 A * 3/1997 Quattromani ....... G06F 9/30043
708/104
6,717,577 B1 4/2004 Cheng et al.
(Continued)

FOREIGN PATENT DOCUMENTS

CN 1684104 A 10/2005
CN 1825356 A 8/2006
(Continued)

OTHER PUBLICATIONS

Hasselgren, J., Munkberg, J., & Akenine-Möller, T. (2009). "Automatic Pre-tessellation Culling", ACM Transactions on Graphics (TOG), 28(2), 19, pp. 19:1 to 19:10 (ten pages).*
(Continued)

*Primary Examiner* — Sarah Lhymn
(74) *Attorney, Agent, or Firm* — JDI Patent; Joshua D. Isenberg; Robert Pullman

(57) ABSTRACT

A set of graphics primitive information for a virtual object may be processed with compute shader running on a graphics processing unit (GPU) to generate a modified set of primitive information. The modified set of primitive information may be passed to a vertex shader running on the GPU. The vertex shader may perform vertex shading on the modified set of primitive information. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

26 Claims, 4 Drawing Sheets

(51) Int. Cl.
  *G06T 15/30* (2011.01)
  *G06T 15/40* (2011.01)
(58) Field of Classification Search
  USPC ....... 345/418, 419, 420, 421, 422, 423, 424,
      345/426, 501, 581, 582, 583, 584, 585,
      345/619
  See application file for complete search history.

(56) References Cited

U.S. PATENT DOCUMENTS

| | | | |
|---|---|---|---|
| 7,009,615 B1 | 3/2006 | Kilgard et al. | |
| 7,468,726 B1 | 12/2008 | Wloka et al. | |
| 7,552,316 B2 | 6/2009 | Hussain | |
| 7,599,975 B1 | 10/2009 | Donovan et al. | |
| 8,254,701 B1 | 8/2012 | Diard | |
| 8,502,825 B2 | 8/2013 | Zalewski et al. | |
| 8,542,247 B1* | 9/2013 | Hakura | G06T 15/005 345/620 |
| 8,595,747 B2 | 11/2013 | Iwamoto | |
| 8,760,460 B1* | 6/2014 | Kilgariff | G06T 1/60 345/543 |
| 8,788,951 B2 | 7/2014 | Zalewski et al. | |
| 2002/0196251 A1* | 12/2002 | Duluk, Jr. | G06T 1/60 345/420 |
| 2005/0122338 A1* | 6/2005 | Hong | G06T 15/405 345/546 |
| 2006/0173610 A1 | 8/2006 | Listle | |
| 2007/0171219 A1 | 7/2007 | Tsao | |
| 2008/0204451 A1 | 8/2008 | Im et al. | |
| 2009/0182948 A1 | 7/2009 | Jiao et al. | |
| 2010/0302246 A1 | 12/2010 | Jiao et al. | |
| 2011/0063311 A1 | 3/2011 | McCrary et al. | |
| 2011/0102448 A1 | 5/2011 | Hakura et al. | |
| 2011/0216069 A1 | 9/2011 | Keall et al. | |
| 2011/0242117 A1 | 10/2011 | Bolz et al. | |
| 2012/0062553 A1 | 3/2012 | Yang | |
| 2012/0096474 A1* | 4/2012 | Jiao | G06F 9/485 718/107 |
| 2012/0223947 A1 | 9/2012 | Nystad et al. | |
| 2013/0113790 A1 | 5/2013 | Kazakov | |
| 2013/0194286 A1* | 8/2013 | Bourd | G06F 9/544 345/545 |
| 2014/0082293 A1* | 3/2014 | Alexander | G06F 9/467 711/133 |

FOREIGN PATENT DOCUMENTS

| | | |
|---|---|---|
| CN | 103020205 A | 4/2013 |
| EP | 2309460 A1 | 4/2011 |
| JP | 2001195603 A | 7/2001 |
| JP | 2010535393 A | 11/2010 |
| JP | 2012185821 A | 9/2012 |
| WO | 2013036358 A1 | 3/2013 |

OTHER PUBLICATIONS

"Tutorial—Compute Shader Filters", Aug. 6, 2012, available at: http://www.codinglabs.net/tutorial_compute_shaders_filters.aspx (pp. 1-11) (last visited: Aug. 29, 2016).*
"Stack Overflow: DirectX11: Pass Data from Compute Shader to Vertex Shader", Nov. 2, 2010, available at: http://stackoverflow.com/questions/4049787/directx11-pass-data-from-computeshader-to-vertexshader (last visited: Aug. 29, 2016).*
"OpenGL 4.3 Overview, SIGGRAPH 2012", Sep. 16, 2012, available at: https://www.khronos.org/assets/uploads/developers/library/2012-siggraph-opengl-bof/OpenGL-4.3-Overview-SIGGRAPH_Aug12.pdf (pp. 1-36) (last visited: Aug. 29, 2016).*
Engel, Wolfgang, Ed.: "GPU Pro4 Advanced Rendering Techniques", A K Peters/CRC Press 2013. pp. 21-37.*
Mehta, Prateek. Learn OpenGL ES: for Mobile Game and Graphics Development. Apress, 2013, p. 1-199.*
Valdetaro, Alexandre, et al. "Understanding Shader Model 5.0 With Directx11." IX Brazilian symposium on computer games and digital entertainment. vol. 1. No. 2. 2010 (pp. 1-18.*
International Search Report and Written Opinion for International Application No. PCT/2014/041386, dated Oct. 9, 2014.
International Search Report and Written Opinion for International Application No. PCT/US2014/041382, dated Oct. 9, 2014.
International Search Report and Written Opinion for International Application No. PCT/US2014/041390, dated Oct. 9, 2014.
U.S. Appl. No. 14/297,201, to Mark Evan Cerny, filed Jun. 5, 2014.
U.S. Appl. No. 14/297,231, to Mark Evan Cerny, filed Jun. 5, 2014.
U.S. Appl. No. 14/297,290, to Mark Evan Cerny, filed Jun. 5, 2014.
U.S. Appl. No. 61/833,213, to Mark Cerny, filed Jun. 10, 2013.
U.S. Appl. No. 61/833,218, to Mark Cerny, filed Jun. 10, 2013.
U.S. Appl. No. 61/833,229, to Mark Cerny, filed Jun. 10, 2013.
U.S. Appl. No. 61/833,233, to Mark Cerny, filed Jun. 10, 2013.
"Tutorial—Compute Shader Filters", Aug. 6, 2012, available at: http://www.codinglabs.net/tutorial~compute~shaders~filters.as(ppxp . 1-11) (last visited: Aug. 29, 2016).
Non-Final Office Action for U.S. Appl. No. 14/297,201, dated Jul. 6, 2016.
Non-Final Office Action for U.S. Appl. No. 14/297,231, dated Jun. 27, 2016.
Non-Final Office Action for U.S. Appl. No. 14/297,290, dated Sep. 2, 2016.
EP Search Report for EP Application No. 14811318.6, dated Jan. 24, 2017.
Final Office Action for U.S. Appl. No. 14/297,201, dated Jan. 27, 2017.
Final Office Action for U.S. Appl. No. 14/297,231, dated Jan. 3, 2017.
Japanese Office Action for JP Application No. 2016-518048, dated Mar. 10, 2017.
Japanese Office Action for JP Application No. 2016-519563, dated Mar. 13, 2017.
Japanese Office Action for JP Application No. 2016-519564, dated Mar. 10, 2017.
Gamasutra—Occlusion Culling Algorithms.
NVIDIA's Fermi the First Complete GPU Architecture.doc—Glaskowsky.
Final Office Action for U.S. Appl. No. 14/297,248, dated Oct. 2, 2017.
International Search Report and Written Opinion for International Application No. PCT/US2014041386, dated Dec. 8, 2016.
Japanese Office Action for Japanese Application No. 2016-518048, dated Oct. 3, 2017.
Final Office Action for U.S. Appl. No. 14/297,201, dated Jan. 24, 2018.
Final Office Action for U.S. Appl. No. 14/297,231, dated Jan. 24, 2018.
Final Office Action for U.S. Appl. No. 14/297,290, dated Mar. 20, 2018.
Office Action dated Jan. 24, 2018 for Chinese Patent Application No. 201480032468.7.
Japanese Office Action dated Mar. 27, 2018 for Japanese Application No. 2016-518048.
Office Action dated Mar. 14, 2018 for Chinese patent application No. 201480033281.9.
Notice of Allowance dated Apr. 17, 2018 for U.S. Appl. No. 14/297,231.
"Automatic Pre-Tessellation Cullling." Hasselgren, John. ACM Transactions on Graphics. vol. 28, Issue 2. pp. 1-10.
Non-Final Office Action for U.S. Appl. No. 14/297,231, dated Jul. 7, 2017.
Office Action for Chinese Patent Application No. 201480033091.7, dated Jul. 28, 2017.
Minmin Gong, "GPU Gems 2—Programming Techniques for High-Performance Graphics and General-Purpose Computation", pp. 342-346, Tsinghua University Press, May 2017).
Notice of Allowance for U.S. Appl. No. 14/297,290, dated Aug. 9, 2018.

(56) References Cited

OTHER PUBLICATIONS

Office Action dated Sep. 11, 2018 for Chinese patent application No. 201480032468.7.

* cited by examiner

USING COMPUTE SHADERS AS FRONT END FOR VERTEX SHADERS

CLAIM OF PRIORITY

This application claims the priority benefit of commonly-assigned U.S. provisional patent application No. 61/833,229 filed Jun. 10, 2013, the entire disclosures of which are incorporated herein by reference.

FIELD OF THE DISCLOSURE

Aspects of the present disclosure are related to computer graphics. In particular, the present disclosure is related to use of compute shaders and vertex shaders in a graphics processing unit.

BACKGROUND

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, tablet computers, portable game devices, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send commands to the GPU to implement a particular graphics processing task, e.g. render a particular texture that has changed with respect to a previous frame in an image. These draw commands may be coordinated by the CPU with a graphics application interface (API) in order to issue graphics rendering commands that correspond to the state of the particular application's virtual environment.

In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data suitable for output display, and additional rendering tasks on the pixels (or fragments) before outputting the rendered image on a display.

Virtual objects of an image are often described in virtual space in terms of shapes known primitives, which together make the shapes of the objects in the virtual scene. For example, objects in a three-dimensional virtual world to be rendered may be reduced to a series of distinct triangle primitives having vertices defined in terms of their coordinates in three-dimensional space, whereby these polygons make up the surfaces of the objects. Each polygon may have an associated index that can be used by the graphics processing system to distinguish a given polygon from other polygons. Likewise, each vertex may have an associated index that can be used to distinguish a given vertex from other vertices. A graphics pipeline may perform certain operations on these primitives to produce visuals for the virtual scene and transform this data into a two-dimensional format suitable for reproduction by the pixels of the display. The term graphics primitive information (or simply "primitive information"), as used herein, is used to refer to data representative of a graphics primitive. Such data includes, but is not limited to, vertex information (e.g., data representing vertex positions or vertex indices) and polygon information, e.g., polygon indices and information that associates particular vertices with particular polygons.

A GPU may perform rendering tasks of the graphics pipeline by implementing programs commonly known as shaders. A typical graphics pipeline may include vertex shaders, which may manipulate certain properties of the primitives on a per-vertex basis, as well as pixel shaders (also known as "fragment shaders"), which operate downstream from the vertex shaders in the graphics pipeline and may manipulate certain values on a per-pixel basis before transmitting the pixel data to a display. The pipeline may also include other shaders at various stages in the pipeline, such as geometry shaders that use the output of the vertex shaders to generate a new set of primitives, as well as compute shaders (CS) which may implemented by a GPU to perform certain other general computational tasks.

Because many of the polygons that make up a virtual object may share common vertices, shader programs may utilize vertex buffers defining coordinates of distinct vertices in conjunction with index buffers that identify which coordinates belong to which triangles. The index buffers may include index tables identifying draw objects by their corresponding vertices defined in the vertex buffer.

In any particular image to be rendered, an object in a virtual world may include many polygons that are hidden from view in the image, such as backfaced and off-screen triangles. Moreover, virtual objects in an image may include zero-pixel triangles that are so small in size that they have no pixel centers to render on a display. It is useful to remove such polygons from the graphics pipeline to speed up the graphics pipeline.

It is within this context that the present disclosure arises.

SUMMARY

According to an aspect of the present invention, a computer graphics processing method may include processing a set of graphics primitives for a virtual object with compute shader running on a GPU to generate a modified set of primitive information, passing the modified set of primitive information to a vertex shader running on the GPU, and performing vertex shading on the modified set of primitives with the vertex shader.

The aforementioned aspects of the present disclosure may be implemented using a computer graphics system, having a graphics processing unit (GPU) configured to process a set of graphics primitives for a virtual object with compute shader miming on the GPU to generate a modified set of primitive information and pass the modified set of primitive information to a vertex shader running on the GPU and performing vertex shading on the modified set of primitive information with the vertex shader.

The aforementioned aspects of the present disclosure may be implemented using a non-transitory computer readable medium having computer readable instructions embodied therein. The computer readable instructions may be configured to implement the aforementioned graphics processing method when executed.

In certain implementations processing the set of graphics primitive information includes performing position computations on the set to generate a reduced set of primitive information, wherein the reduced set of primitive information omits one or more items of primitive information of the virtual object. In certain implementations, the primitive information may include information representative of one or more polygons. In some such implementations, the one or more omitted primitive information may include indices corresponding to one or more backfaced polygons or more off-screen polygons or zero pixel polygons. In some such implementations, processing the set of graphics primitive information includes culling an index table for a set of polygons to remove polygons that will not be presented on a display.

In some implementations, the method may further include compiling a vertex shader instruction a first time to generate the compute shader; and compiling the vertex shader instruction a second time to generate the vertex shader.

In some implementations, the modified set of primitive information may be passed to the vertex shader through a ring buffer.

In some implementations, the vertex shader does not repeat any processing of the graphics primitive information performed by the compute shader.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Figure 1A:
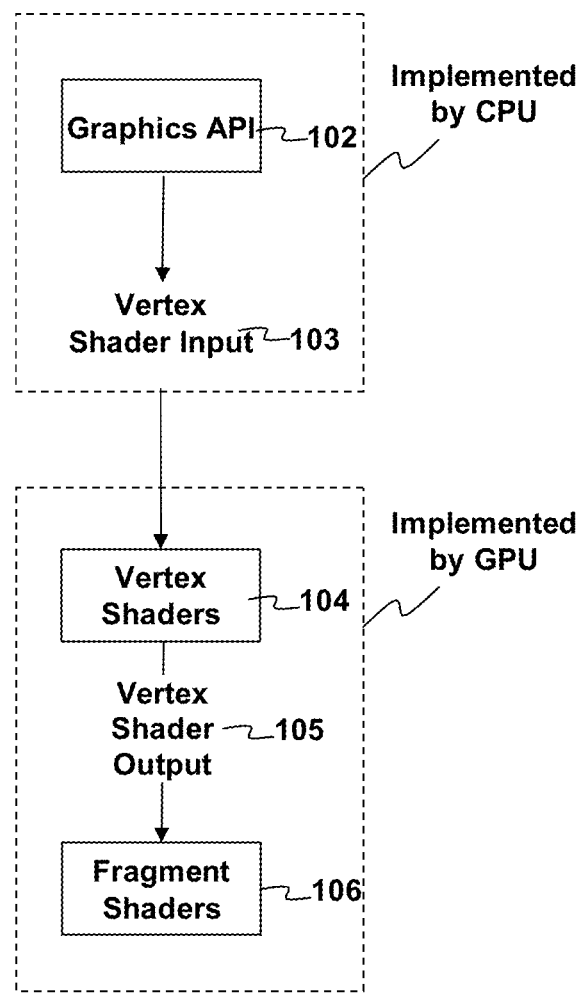
FIG. 1A is a block diagram of a conventional graphics processing implementation.

As seen in FIG. 1A, conventional graphics processing is typically implemented by a system 100 having a CPU and a GPU. The CPU typically implements a graphics application program interface (API) 102 that produces shader input for the GPU. In general the CPU may obtain data regarding vertices that make up an object to be rendered by the GPU and perform some processing on the data before it is rendered. Such processing may include culling an index table. This type of operation involves analyzing the set of polygons (e.g., triangles) that make up the object to determine whether any of the polygons do not need to be rendered. Each polygon in the set may be identified by an index that identifies polygon. Each polygon may be further characterized by a set of vertices, each of which may have a corresponding index as well as a set of coordinates (e.g., x,y,z,w) coordinates. A vertex is a data structure that describes a point in 2D or 3D space. Display objects are composed of arrays of flat surfaces (e.g., triangles) and vertices define the location and other attributes of the corners of the surfaces. Vertices may be associated not only with position but also with other graphical attributes used to render the object correctly. Such attributes may include, but are not limited to color at the vertex point, reflectance of the surface at the vertex, coordinates of textures to apply to the surface at the vertex, and the normal of an approximated curved surface at the location of the vertex. The normal can be used to determine a surface's orientation toward a light source for flat shading using Lambert's cosine law, or the orientation of each of the vertices to mimic a curved surface with Phong shading. A vertex shader 104 may use these properties in performing vertex shading. The vertex shader 104 typically transforms each vertex's 3D position in virtual space to the 2D coordinate at which it appears on the screen (as well as a depth value for a Z-buffer).

The graphics API may generate an index table for the object may store the indices for the polygons that make up the object. By way of example, the culling operation implemented by the graphics API may determine whether any of the polygons are backfaced or offscreen (i.e., not visible in the final image), contain no pixels, or are viewed on edge and therefore have zero area. The indices for such polygons may be removed from the index table to produce a culled index table that is sent to the GPU for further processing. In particular, a vertex shader 104 running in the GPU can convert the coordinates for each of the polygons in the culled index table from 3D global coordinates to 2D local coordinates for rendering on a display. The resulting vertex shader output 105 can then be sent to a fragment shader 106 that fills in the resulting polygons with pixels. Vertex shaders are typically run once for each vertex given to the GPU. The GPU hardware typically can implement a limited number of instances of vertex shaders.

Culling the index table with the CPU works well where the CPU hardware is relatively powerful compared to the GPU in terms of processing capabilities. However, as GPU hardware becomes more capable, it would be desirable to perform tasks like index culling on the GPU. Modern GPUs can implement highly parallel processing and it would be advantageous to utilize this capability to reduce bottlenecks in the graphics pipeline.

Method

According to Aspects of the present disclosure certain parts of the graphics pipeline traditionally performed by the CPU using a compute shader running on the GPU.

Figure 1B:
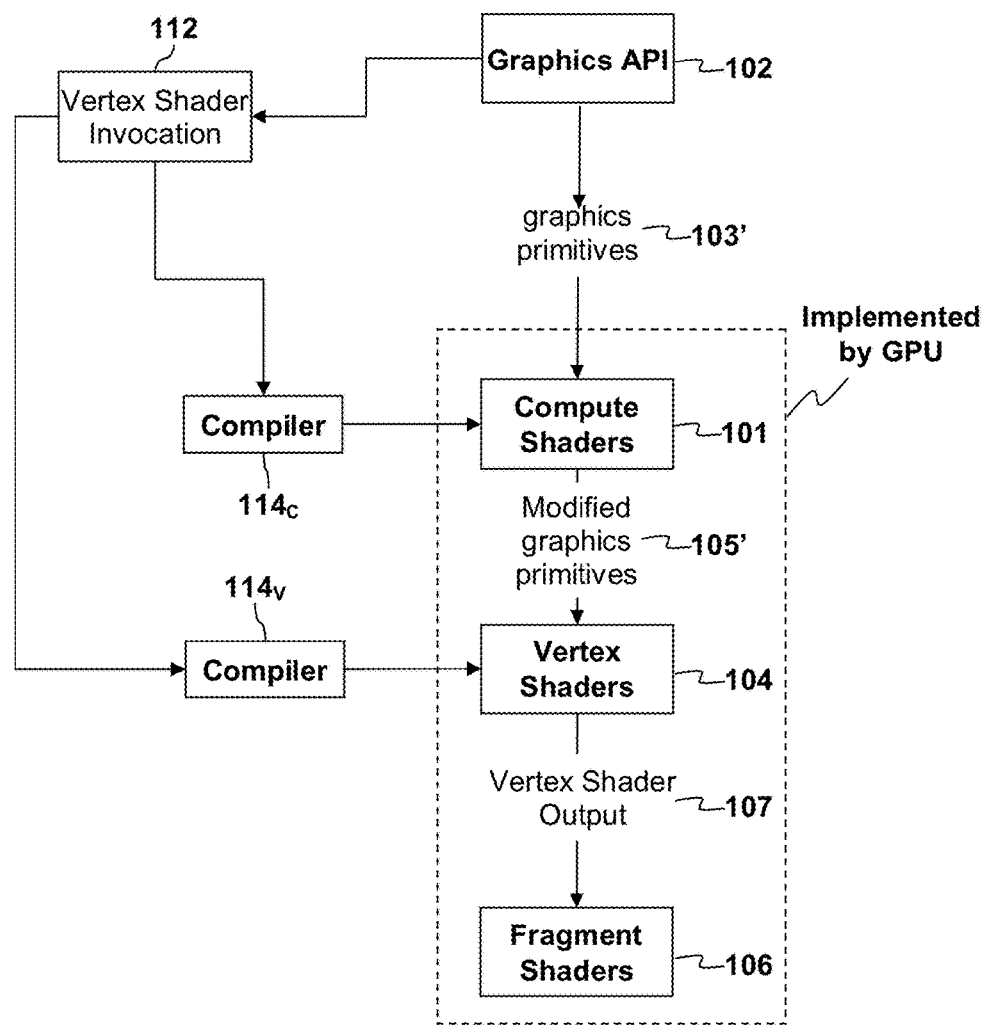
FIG. 1B is a block diagram illustrating a graphics processing in accordance with an aspect of the present disclosure.

As shown in the method 100B of FIG. 1B, according to aspects of the present disclosure processing of a set of graphics primitive information 103' can be done by the compute shader 101 running on a GPU and the resulting modified set of primitive information 105' can be passed to a vertex shader 104 miming on the GPU without having to have the vertex shader repeat any of the processing done by the compute shader. This avoids having to perform the processing that produces the modified set of primitive information with the CPU and thereby avoids bottlenecks associated with transferring data between the CPU and the GPU. The vertex shader 104 can produce output 107 that can be sent to a fragment shader 106 that fills in the resulting polygons with pixels.

According to certain aspects of the present disclosure, a graphics API 102 can invoke a vertex shader as indicated at 112. The graphics API may run on a CPU that is separate and distinct from the GPU. The vertex shader invocation may be compiled once by a compiler $114_C$ to generate the compute shader 101 and compiled a second time by a compiler $114_V$ to generate the vertex shader 104.

A compute shader is a shader stage that can be run on the GPU to perform arbitrary computations. Although compute shaders could do rendering, they are generally used for tasks not directly related to drawing polygons and pixels. Compute shaders operate differently from other shader stages in that all of the other shader stages (e.g., vertex shaders and pixel shaders) a well-defined sets of input and output values, which may be built-in or user-defined. The frequency at which a shader stage executes is specified by the nature of that stage; vertex shaders execute once per input vertex, for example (though some executions can be skipped via caching). Fragment (or pixel) shader execution is defined by the fragments generated from the rasterization process.

Compute shaders, by contrast operate on a data "space" that is largely abstract. Each compute shader decides what the space means. The number of compute shader executions is defined by the function used to execute the compute operation. As a result, the number of compute shader instances that can be run at one time is almost unlimited. Most important of all, compute shaders have no user-defined inputs and no outputs at all. The built-in inputs only define where in the "space" of execution a particular compute shader invocation is.

Therefore, if a compute shader wants to take some values as input, it is up to the shader itself to fetch that data, via texture access, arbitrary image load, shader storage blocks, or other forms of interface. Similarly, if a compute shader is to actually compute anything, it must explicitly write to an image or shader storage block.

Because of these properties, a compute shader may be used to implement tasks such as index culling on the GPU that were formerly performed on the CPU. According to aspects of the present disclosure this may be implemented as shown in FIG. 2.

Figure 2:
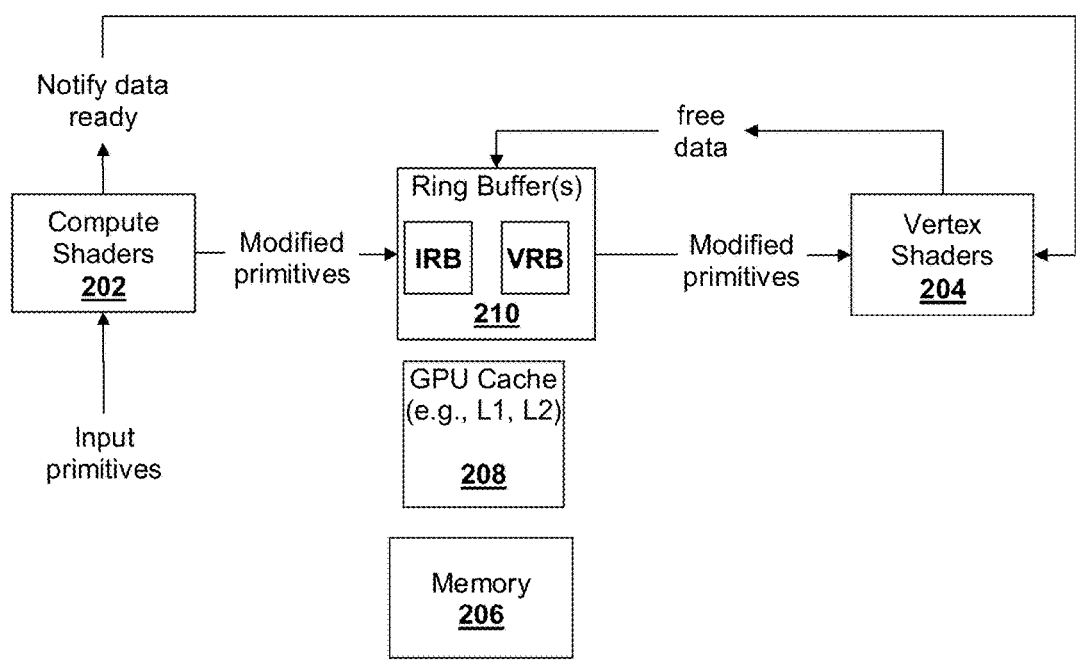
FIG. 2 is a block diagram of a portion of a graphics processing system in accordance with aspects of the present disclosure.

In FIG. 2, a GPU 200 may be configured to run a compute shader 202 and a vertex shader 204. The compute shader 202 may operate on input data received from a source outside the GPU, e.g., from a CPU (not shown). Output generated by the compute shader 202 may be passed to the vertex shader 204 for further processing.

In certain implementations, the data may be passed from the compute shader to the vertex shader via one or more ring buffers 210. This type of buffer uses a single fixed sized buffer that is configured as if it were connected end to end. When the buffer is full and new data is to be added to the buffer existing data is overwritten. However, if the ring buffer is large enough and the operations of the compute shader and vertex shader are sufficiently synchronized the vertex shader can access data written by the compute shader before it is overwritten. The ring buffer 210 reuses the same piece of memory and stores the index data only for as long as it is needed. As soon as the data in the ring buffer 210 is passed to the vertex shader 204 that data can be written over.

It is noted that there may be more than one ring buffer depending on the type of data to be buffered. For example, index data may be buffered in an index ring buffer IRB and vertex data may be buffered in a separate detected vertex ring buffer VRB. The ring buffers 210 may be mapped to the memory 206. The compute shader 202 may write index data through the index ring buffer IRB and write vertex data through the vertex ring buffer VRB.

Although the ring buffers 210 are mapped to memory writes to the ring buffers initially sit in a GPU cache 208. If the vertex shader 204 can read the data as it is going into the GPU cache 208 and before its overwritten and before other processes that are running on the GPU 204 flush it out because they need space in the cache then the data will go into the ring buffer 210 from the compute shader 202 and out of the ring buffer 210 to the vertex shader 204. Many cycles of such writing and reading of data through the ring buffer 210 can take place without the data ever being written to a memory 206. Only after the system is run will the small amount of data in the ring buffer 210 be evicted into memory 206. Therefore the only memory bandwidth need for the data that is passed from the compute shader 202 to the vertex shader 204 is the size of the relevant ring buffer 210. By way of example, and not by way of limitation, the size of the index ring buffer IRB can be much smaller than the total size of index data that is being passed from the compute shader 202 to the vertex shader 204. For example, the total amount of index data in a culled index table may be about 1 MB but the size of the index ring buffer IRB may be only 48 KB. The GPU 200 therefore only needs 48 KB of memory bandwidth to implement the culling with the compute shader 202. If, by contrast the compute shader 202 runs a long time ahead of running the vertex shader 204 1 MB of space would be required to hold all 1 MB of indices until the vertex shader 204 runs the graphics tasks that use the indices. By using a tightly coupled system with a ring buffer 210 the memory footprint for the index data can be greatly reduced.

Access to the index ring buffer 210 should be synchronized in order to tightly couple the operations of the compute shader 202 and vertex shader 204. Such synchronization involves making sure that data is not flushed or overwritten before the vertex processor 204 has used it. The speed of the synchronization determines the size of the ring buffer 210 that is needed. In general faster synchronization results in a smaller required ring buffer size. Furthermore, if the synchronization requires too much overhead bottlenecks may be introduced into the GPU. To implement the synchronization, the hardware of the GPU 200 may be configured to control access to the ring buffers 210 prevent data from being discarded from a ring buffer before it is needed by the vertex shader 204.

There are a number of ways in which the GPU 200 may be used. For example, the compute shader 202 may be configured to implement polygon culling (e.g., triangle culling), as discussed above. In such a case, the culled index data may be passed through to the vertex shader via the index ring buffer IRB. It is noted that the three-dimensional positions of the vertices are generated as part of the process of polygon culling. Once the positions of the vertices have been computed by the compute shader 202 they can be stored in the vertex ring buffer VRB and passed through to the vertex shader so that the vertex shader does not have to re-compute them.

As noted above, the GPU 200 can be configured to pass vertex data as well as index data. As such, implementations of aspects of the present disclosure are not limited to those involving generation of culled index tables using a compute shader. Examples of operations that could be implemented with the compute shader 202 include vertex transforms that are closely related to an underlying physics simulation. One such example is known as skinning of vertices, which is a common operation in computer games or video games. In a skinning operation, the locations of the vertices that are passed to the vertex shader are tied in some way to underlying structures sometimes known as "bones". The bones may be thought of as skeletal features that are subject to constraints (e.g., joints). The movements of the bones may be determined through a physics simulation run on a CPU. The vertices are said to be "skinned" to one or more bones through corresponding transform matrices. In general, there may be one local transform matrix per bone. Each vertex may reference some number of bones with a different weight for each reference. To calculate the vertex position, the vertex may be transformed separately according to each affecting bone's transform matrix, and the separate results may then be blended (interpolated) based on the weights to determine the final position of the vertex.

Normally a compute shader would have to perform the skinning work to determine the vertex positions then write up the index data for the corresponding polygons and pass that data to the vertex shader. The vertex shader would then re-do all of the skinning work. However, according to aspects of the present disclosure, the ring buffer 210 may be used to pass the skinned vertex data from the compute shader 202 to the vertex shader 204 without having to have the vertex shader re-do the vertex calculations. The compute shader 202 would just pass the skinned vertex data to the vertex shader via the vertex ring buffer VRB.

Figure 3:
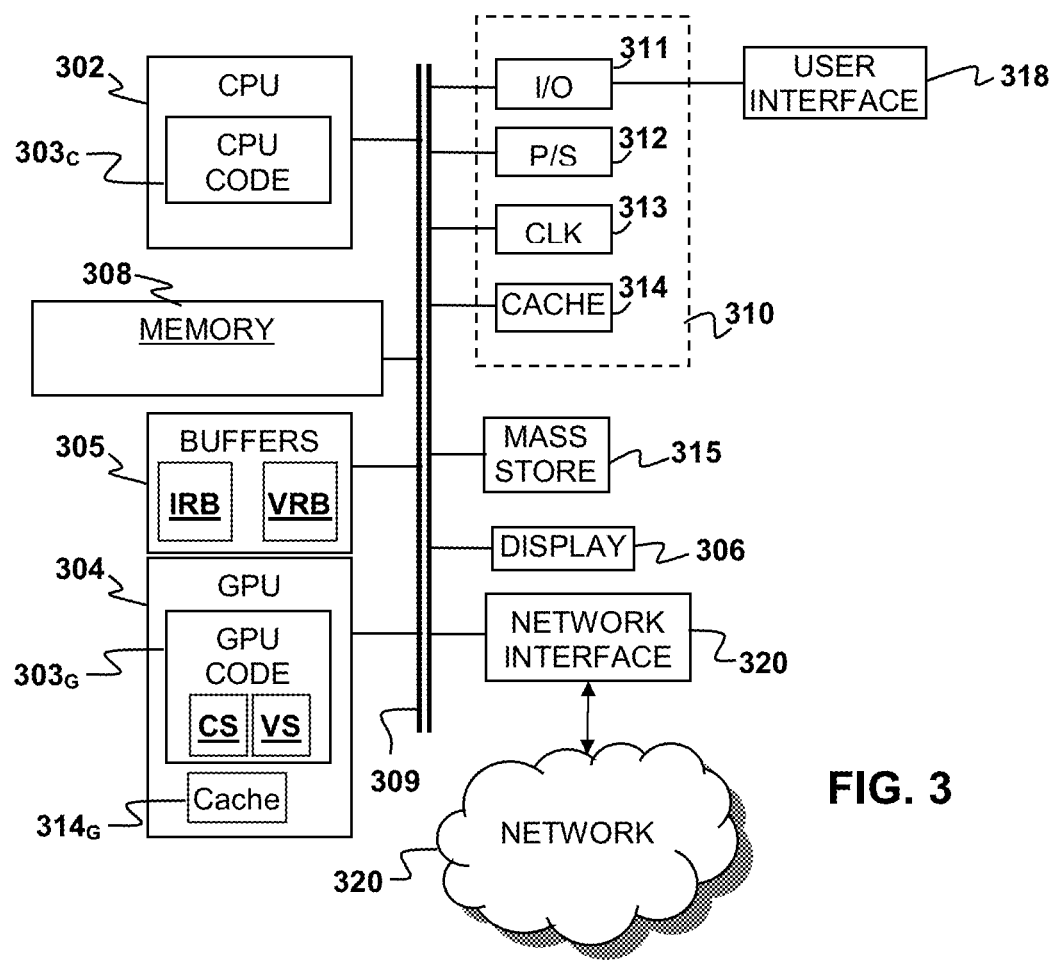
FIG. 3 is a block diagram of a graphics processing system in accordance with aspects of the present disclosure.

Aspects of the present disclosure include graphics processing systems that are configured to implement the features discussed above. By way of example, and not by way of limitation, FIG. 3 illustrates a block diagram of a computer system 300 that may be used to implement graphics processing according to aspects of the present disclosure. According to aspects of the present disclosure, the system 400 may be an embedded system, mobile phone, personal computer, tablet computer, portable game device, workstation, game console, and the like.

The system 300 generally may include a central processor unit (CPU) 302, a graphics processor unit (GPU) 304, and a memory 308 that is accessible to both the CPU and GPU. The CPU 302 and GPU 304 may each include one or more processor cores, e.g., a single core, two cores, four cores, eight cores, or more. The memory 308 may be in the form of an integrated circuit that provides addressable memory, e.g., RAM, DRAM, and the like.

By way of example, and not by way of limitation, the CPU 302 and GPU 304 may access the memory 308 using a data bus 309. In some cases, it may be useful for the system 300 to include two or more different buses. The memory 308 may contain data that can be accessed by the CPU 302 and GPU 304. The GPU 304 may include a plurality of compute units configured to perform graphics processing tasks in parallel. Each compute unit may include its own dedicated local memory store, such as a local data share.

The CPU may be configured to execute CPU code $303_C$, which may include an application that utilizes graphics, a compiler and a graphics API. The graphics API can be configured to issue draw commands to programs implemented by the GPU. The CPU code $303_C$ may also implement physics simulations and other functions. The GPU may be configured to operate as discussed above with respect to FIG. 2. In particular, the GPU may execute GPU code $303_G$, which may implement compute shaders CS and vertex shaders VS, as discussed above. To facilitate passing of data between the compute shaders CS and the vertex shaders VS the system may include one or more ring buffers 305, which may include index ring buffers IRB and vertex ring buffers VRB. The GPU code $303_G$ may also optionally implement other types of shaders (not shown), such as pixel shaders or geometry shaders. Each compute unit may include its own dedicated local memory store, such as a local data share.

The system 300 may also include well-known support functions 310, which may communicate with other components of the system, e.g., via the bus 309. Such support functions may include, but are not limited to, input/output (I/O) elements 311, power supplies (P/S) 312, a clock (CLK) 313 and cache 314. In addition to the cache 314, the GPU 304 may include its own GPU cache $314_G$, and the GPU may be configured so that programs running on the GPU 304 can read-through or write-though the GPU cache $314_G$ in particular, the system may be configured so that compute shaders running on the GPU can write-through the GPU cache to the memory or buffers and vertex shaders can read through the GPU cache $314_G$ from the memory or buffers.

The system 300 may optionally include a mass storage device 315 such as a disk drive, CD-ROM drive, flash memory, tape drive, or the like to store programs and/or data. The system 300 may also optionally include a display unit 306 and user interface unit 318 to facilitate interaction between the system 300 and a user. The display unit 306 may be in the form of a flat panel display, cathode ray tube (CRT) screen or other device that can display text, numerals, graphical symbols or images. The user interface 318 may include a keyboard, mouse, joystick, light pen, game controller, or other device that may be used in conjunction with a graphical user interface (GUI). The system 300 may also include a network interface 320 to enable the device to communicate with other devices over a network 322. The network 322 may be, e.g., a local area network (LAN), a wide area network such as the internet, a personal area network, such as a Bluetooth network or other type of network. These components may be implemented in hardware, software, or firmware, or some combination of two or more of these.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A computer graphics processing method, comprising:
   fetching data corresponding to a set of graphics primitive information with a compute shader running on a GPU;
   processing the set of graphics primitive information for a virtual object with the compute shader running on the GPU to generate a modified set of primitive information;
   passing the modified set of primitive information to a vertex shader running on the GPU by explicitly writing data corresponding to the modified set of primitive information with the compute shader running on the GPU, wherein the data corresponding to the modified set of primitive information includes at least skinned vertex data; and
   performing vertex shading on the modified set of primitive information with the vertex shader, wherein the compute shader is configured to write through a GPU cache to a ring buffer and the vertex shader is configured to read through the GPU cache from the ring buffer wherein the vertex shader accesses the skinned vertex data and wherein the vertex shader does not recompute vertex positions determined by the compute shader.

2. The method of claim 1, wherein processing the set of graphics primitive information with the compute shader running on a GPU includes performing position computations on the set of to generate a reduced set of primitive information, wherein the reduced set of primitive information omits one or more items of primitive information of the virtual object.

3. The method of claim 2, wherein the primitive information includes information representative of one or more polygons.

4. The method of claim 3, wherein the one or more omitted items of primitive information include indices corresponding to one or more backfaced polygons.

5. The method of claim 3, wherein the one or more omitted items of primitive information include indices corresponding to one or more off-screen polygons.

6. The method of claim 3, wherein the one or more omitted items of primitive information include indices corresponding one or more zero-pixel polygons.

7. The method of claim 3, wherein said processing a set of graphics primitive information for a virtual object includes culling an index table for a set of polygons to remove polygons that will not be presented on a display.

8. The method of claim 1, further comprising:
compiling a vertex shader instruction a first time to generate the compute shader; and
compiling the vertex shader instruction a second time to generate the vertex shader.

9. The method of claim 1, wherein the GPU further comprises the ring buffer and wherein said passing the modified set of primitive information to a vertex shader includes passing the modified set of primitive information through a ring buffer.

10. The method of claim 1, wherein the vertex shader does not repeat any processing of the graphics primitive information performed by the compute shader.

11. The method of claim 1, wherein fetching the data corresponding to a set of graphics primitive information with a compute shader running on a GPU includes using texture access, arbitrary image load, or shader storage blocks.

12. The method of claim 1, wherein explicitly writing data corresponding to the modified set of primitive information with the compute shader running on the GPU includes writing to an image or shader storage block.

13. A computer graphics system, comprising:
a graphics processing unit (GPU) configured to fetch data corresponding to a set of graphics primitive information with a compute shader running on a GPU, process the set of graphics primitive information for a virtual object with the compute shader running on the GPU to generate a modified set of primitive information and pass the modified set of primitive information to a vertex shader running on the GPU by explicitly writing data corresponding to the modified set of primitive information with the compute shader running on the GPU, and perform vertex shading on the modified set of primitive information with the vertex shader, wherein the data corresponding to the modified set of primitive information includes at least skinned vertex data, wherein the compute shader is configured to write through a GPU cache to a ring buffer and the vertex shader is configured to read through the GPU cache from the ring buffer wherein the vertex shader accesses the skinned vertex data and wherein the vertex shader does not recompute vertex positions determined by the compute shader.

14. The system of claim 13, wherein processing the set of graphics primitive information with the compute shader running on a GPU includes performing position computations on the set of to generate a reduced set of primitive information, wherein the reduced set of primitive information omits one or more items of primitive information of the virtual object.

15. The system of claim 14, wherein the primitive information includes information representative of one or more polygons.

16. The system of claim 15, wherein the polygons are triangles.

17. The system of claim 15, wherein the one or more omitted items of primitive information include indices corresponding to one or more backfaced polygons.

18. The system of claim 15, wherein the one or more omitted items of primitive information include indices corresponding to one or more off-screen polygons.

19. The system of claim 15, wherein the one or more omitted items of primitive information include indices corresponding one or more zero-pixel polygons.

20. The system of claim 15, wherein said processing a set of graphics primitive information for a virtual object includes culling an index table for a set of polygons to remove polygons that will not be presented on a display.

21. The system of claim 13, further comprising a central processing unit (CPU), wherein the CPU is configured to compile a vertex shader instruction a first time to generate the compute shader; and compile the vertex shader instruction a second time to generate the vertex shader.

22. The system of claim 13, wherein the GPU further comprises the ring buffer, wherein the GPU is configured to pass the modified set of primitive information from the compute shader to the vertex shader through the ring buffer.

23. The system of claim, 13, wherein the system is an embedded system, mobile phone, personal computer, tablet computer, portable game device, workstation, or game console.

24. The system of claim 13, wherein the GPU is configured to fetch data corresponding to a set of graphics primitive information with a compute shader running on a GPU via texture access, arbitrary image load, or shader storage blocks.

25. system of claim 13, wherein the GPU is configured to explicitly write data corresponding to the modified set of primitive information with the compute shader running on the GPU by writing to an image or shader storage block.

26. A non-transitory computer readable medium having computer readable instructions embodied therein, the computer readable instructions being configured to implement a graphics processing method when executed, the graphics processing method comprising:
fetching data corresponding to a set of graphics primitive information with a compute shader running on a GPU;
processing the set of graphics primitive information for a virtual object with the compute shader running on the GPU to generate a modified set of primitive information;
passing the modified set of primitive information to a vertex shader running on the GPU, by explicitly writing data corresponding to the modified set of primitive information to a storage block with the compute shader running on the GPU, wherein the data corresponding to the modified set of primitive information includes at least skinned vertex data; and
performing vertex shading on the modified set of primitive information with the vertex shader, wherein the compute shader is configured to write through a GPU cache to a ring buffer and the vertex shader is configured to read through the GPU cache from the ring buffer and wherein the vertex shader accesses the skinned vertex data and wherein the vertex shader does not recompute vertex positions determined by the compute shader.

* * * * *